United States Patent
Streitman et al.

[11] Patent Number: 6,142,480
[45] Date of Patent: Nov. 7, 2000

[54] RESILIENT TYPE SEALING MEMBER FOR SEALING A PUSH ROD MEMBER OF A RAILWAY TYPE VEHICLE BRAKE CYLINDER

[75] Inventors: Lawrence R. Streitman, Pittsburgh; Rowland R. Evans, Irwin; Julie A. Krawczyk, Monroeville, all of Pa.

[73] Assignee: Westinghouse Air Brake Company, Wilmerding, Pa.

[21] Appl. No.: 08/953,800

[22] Filed: Sep. 24, 1997

Related U.S. Application Data

[63] Continuation of application No. 08/669,271, May 29, 1996, abandoned.

[51] Int. Cl.$^7$ .................................. F16J 9/20; F16J 9/28
[52] U.S. Cl. ........................................................ 277/439
[58] Field of Search .................... 277/438, 439, 277/529, 530, 531, 532, 566, 909, 607, 626, 644, 647; 188/33, 34, 35

[56] References Cited

U.S. PATENT DOCUMENTS

| | | |
|---|---|---|
| Re. 24,332 | 6/1957 | Svenson . |
| 2,470,925 | 5/1949 | Fredrickson . |
| 2,841,429 | 7/1958 | McCuistion . |
| 2,992,817 | 7/1961 | Templeton . |
| 3,183,008 | 5/1965 | Yost . |
| 3,653,406 | 4/1972 | Racki .................................. 137/599.2 |
| 4,530,422 | 7/1985 | Bogenschutz ............................ 188/52 |
| 4,787,642 | 11/1988 | Etheridge . |
| 4,867,043 | 9/1989 | Antkowiak ............................ 92/165 R |
| 5,261,677 | 11/1993 | Gotoh et al. . |

FOREIGN PATENT DOCUMENTS

| | | | |
|---|---|---|---|
| 1549562 | 11/1967 | France ................................ 277/206 A |
| 3614109 | 10/1987 | Germany ................................ 277/211 |

*Primary Examiner*—Anthony Knight
*Assistant Examiner*—John L. Beres
*Attorney, Agent, or Firm*—James Ray & Associates

[57] ABSTRACT

An improved resilient type sealing member for use at least in an application which requires both sealing of an annular space between an inner surface of a first member and an adjacent outer surface of a second member at least partially disposed for reciprocal movement within such first member and for providing support to such second member during such reciprocal movement. The improved resilient type sealing member includes a generally round resilient disc-like member having each of a first predetermined diameter and a predetermined thickness. Such resilient disc-like member includes a pair of radially opposed and substantially flat parallel side portions. A first groove, having a first predetermined shape and a first predetermined depth, is formed in a first one of such pair of radially opposed and substantially flat parallel side portions. Such first groove being disposed closely adjacent an outer edge of the resilient disc-like member. A second groove, having a second predetermined shape and a second predetermined depth, is formed in a second one of such pair of side portions. This second groove is disposed substantially radially opposite the first groove. Finally, an aperture, having a second predetermined diameter, is formed substantially through an axial center of such resilient disc-like member.

20 Claims, 2 Drawing Sheets

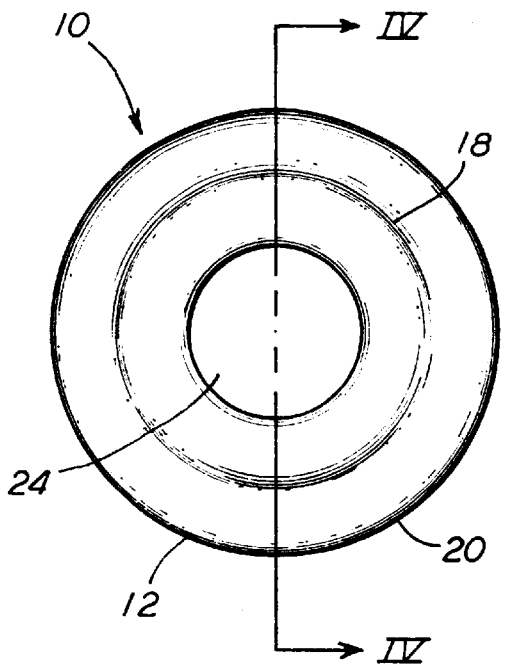
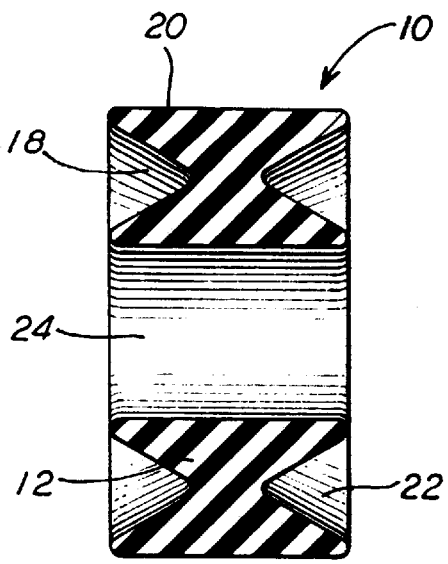
FIG. 3  FIG. 4
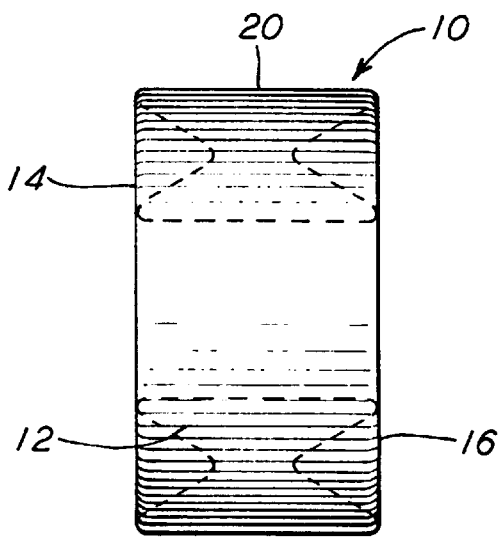
FIG. 5

RESILIENT TYPE SEALING MEMBER FOR SEALING A PUSH ROD MEMBER OF A RAILWAY TYPE VEHICLE BRAKE CYLINDER

CROSS-REFERENCE TO RELATED APPLICATIONS

This application is a continuation of co-pending patent application Ser. No. 08/669,271, filed May 29, 1996, now abandoned.

FIELD OF THE INVENTION

The present invention relates, in general, to a railway vehicle type brake cylinder and, more particularly, this invention relates to an improved resilient type sealing member for sealing an annular space located between the outer surface of a push rod member and an inner surface of a cylinder wall of such railway vehicle type brake cylinder to prevent the undesirable entrance of detrimental extraneous foreign materials into the interior portion of such brake cylinder and, still more particularly, the instant invention relates to an improved resilient type sealing member which will provide both enhanced support and deflection of such push rod member during a brake application by such railway vehicle type brake cylinder.

BACKGROUND OF THE INVENTION

Prior to the conception and development of the instant invention, resilient type rubber sealing members were being extensively used, in the railroad industry, to seal the annular space located between the outer surface of such push rod member and the inner surface of the cylinder wall of such railway vehicle type brake cylinder to prevent undesirable entrance of detrimental extraneous foreign materials into the interior portion of such brake cylinder.

These resilient sealing members are, also, utilized in this particular application to provide a certain degree of support to the push rod member as it is being extended out of the brake cylinder housing during a brake application of such railway vehicle.

However, the configuration of these prior art type sealing members has, on occasion, been a source of trouble in this application. One of the primary problems being encountered with these prior art type sealing members, particularly in a new style brake rigging presently being used in the railroad industry which has a greater angular displacement than the older style brake rigging, is that they often times cause the push rod member to be pushed into greater misalignment. This, in turn, can cause rather severe problems in the push rod member by setting up excessively high bending stresses.

As has generally been illustrated in FIGS. 1 and 2, of the attached drawings, such configuration of these prior art type resilient sealing members includes a relatively wide and substantially round disc-like piece of resilient material having an aperture formed through the center portion thereof, thereby forming a resilient band-like sealing member. Such sealing member exhibits a substantially uniform thickness between the inner surface and the outer surface of the band-like sealing member.

Due to this substantially uniform thickness of such sealing member and because such band-like sealing member is, normally, slightly compressed on installation into the brake cylinder, it is unable to bulge when the push rod member is deflected in a downwardly direction as it moves into a brake applying position. This inability of the sealing member to bulge is believed to be at least one of the primary reasons why such push rod member may be pushed into greater misalignment.

SUMMARY OF THE INVENTION

The present invention, according to a first aspect thereof, provides an improved resilient type sealing member. Such sealing member is, particularly, useful at least in an application which requires both sealing of an annular space located between an inner surface of a first member and an adjacent outer surface of a second member which is at least partially disposed for reciprocal movement within such first member and for providing a required amount of support for such second member during such reciprocal movement. Such improved resilient type sealing member comprising a generally round resilient disc-like member having each of a predetermined diameter and a predetermined thickness. According to the present invention, such resilient disc-like member will include a pair of radially opposed and substantially flat parallel side portions. A first groove, having a first predetermined shape and a first predetermined depth, is formed in a first one of such pair of radially opposed and substantially flat parallel side portions of the resilient disc-like member. The first groove is disposed closely adjacent an outer edge portion of such resilient disc-like member. A second groove, having a second predetermined shape and a second predetermined depth, is formed in a second one of such pair of such radially opposed and substantially flat parallel side portions of this resilient disc-like member. Such second groove is disposed substantially radially opposite to the first groove. The final essential feature required for this embodiment of the resilient sealing member is an aperture, having a predetermined diameter, formed substantially through an axial center of the resilient disc-like member.

The present invention, according to a second important and desirable aspect thereof, provides this improved resilient disc-like sealing member in combination with a railway vehicle type brake cylinder for both sealing an annular space disposed between an outer surface of a push rod member and an inner surface of a brake cylinder housing and for supporting such push rod member as it is moving out of and into such brake cylinder housing during a brake application on such railway vehicle.

OBJECTS OF THE INVENTION

It is, therefore, one of the primary objects of the present invention to provide an improved resilient type sealing member having a configuration which will permit substantially greater misalignment between component parts when such sealing member is subjected to deflection forces being applied thereto while simultaneously retaining its necessary sealing capability.

Another object of the present invention is to provide an improved resilient type sealing member which has a configuration that is relatively easy to mold.

Still another object of the present invention is to provide an improved resilient type sealing member which is relatively inexpensive to produce.

Yet another object of the present invention is to provide an improved resilient type sealing member which can be manufactured from a number of different types of resilient materials and rubber formulations.

A further object of the present invention is to provide an improved resilient type sealing member which has a configuration that can be utilized effectively in a number of rather critical sealing applications.

An additional object of the present invention is to provide an improved resilient type sealing member which will exhibit a relatively long useful life.

Still yet another object of the present invention is to provide an improved resilient type sealing member which is particularly adapted for use in an application which will normally require such sealing member to both seal and support a movable member.

Yet still another object of the present invention is to provide an improved resilient type sealing member which is particularly adapted for use in both the sealing and supporting of a push rod member disposed for reciprocal movement within a housing portion of a railway vehicle type brake cylinder.

In addition to the numerous objects and advantages of the present invention which have been described with some degree of particularity above, it should be both noted and understood that a number of other important objects and advantages of the improved resilient type sealing member will become more readily apparent to those persons who are skilled in the relevant sealing member art from the following more detailed description of the invention, particularly, when such detailed description is taken in conjunction with the attached drawing Figures and with the appended claims.

BRIEF DESCRIPTION OF THE DRAWINGS

FIG. 3 is a side elevation view of a resilient type sealing member in accordance with a presently preferred embodiment of the invention;

FIG. 4 is a cross sectional view of the resilient type sealing member illustrated along the lines IV—IV in FIG. 3;

FIG. 5 is an end view of the resilient type sealing member illustrated in FIGS. 3 and 4.

Figure 1:
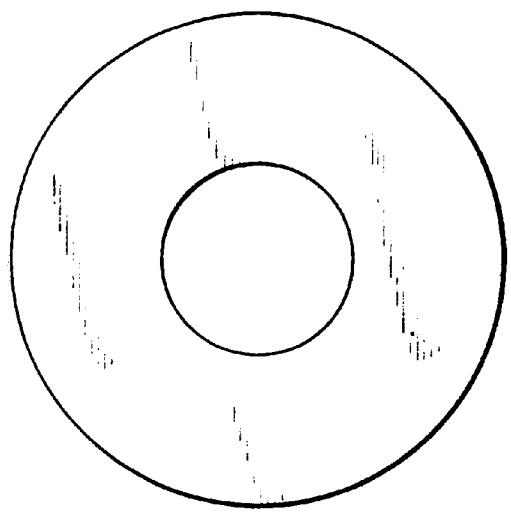
FIG. 1 is a side elevational view of a prior art type resilient sealing member having an aperture formed through the center portion thereof.
Figure 2:
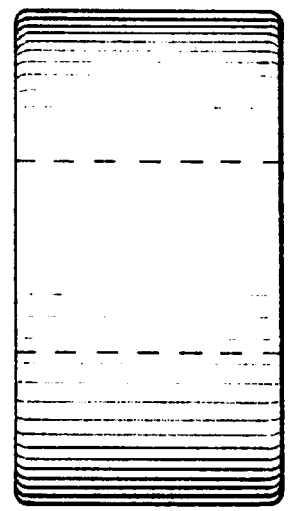
FIG. 2 is a cross sectional view of the prior art type resilient sealing member illustrated in FIG. 1.

BRIEF DESCRIPTION OF THE PRESENTLY PREFERRED AND VARIOUS ALTERNATIVE EMBODIMENTS OF THE PRESENT INVENTION

Prior to proceeding to the more detailed description of the various embodiments of the invention, it should be noted that, for both the sake of clarity and understanding of the improved resilient type sealing member according to the present invention, identical components which have identical functions have been identified with identical reference numerals throughout the several views which have been illustrated in the attached drawing Figures.

Now reference is made, more particularly, to FIGS. 3 through 5. Illustrated therein is a resilient type sealing member, generally designated 10, according to a presently preferred embodiment of the invention.

Figure 6:
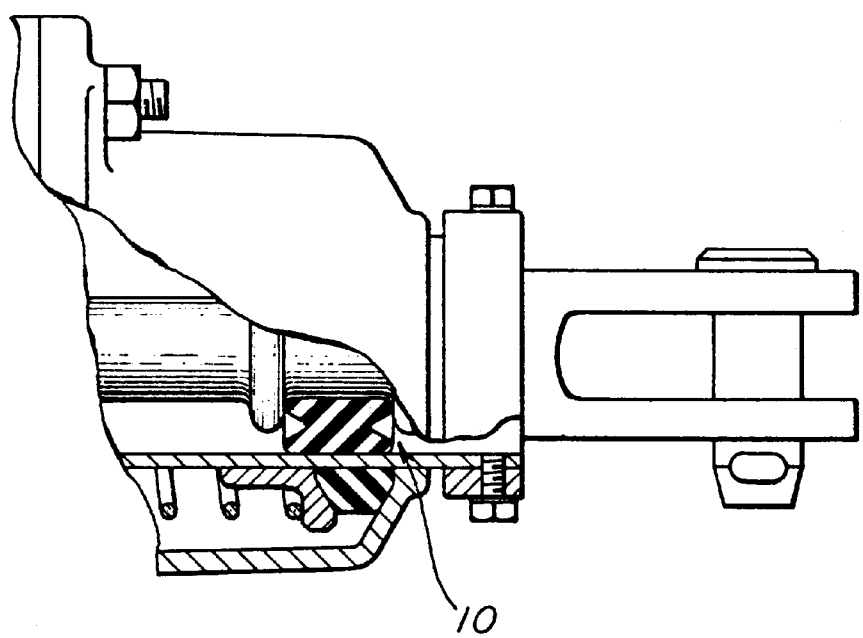
FIG. 6 is a partial cutaway view of a brake cylinder showing the improved resilient sealing member.

Although the present invention is not to be limited thereto or thereby, such improved resilient type sealing member 10 of the invention will be described as it relates to use in a railway vehicle brake cylinder. FIG. 6 shows the relationship of the improved resilient sealing member 10 to a railway vehicle brake cylinder.

Regardless of the intended end use, the improved resilient type sealing member 10 is designed for use at least in an application which requires both sealing of an annular space located between an inner surface of a first member and an adjacent outer surface of a second member at least partially disposed for reciprocal movement within such first member and for providing a required amount of support for such second member during such reciprocal movement.

Such improved resilient type sealing member 10 includes a generally round resilient disc-like member 12 having each of a first predetermined diameter and a predetermined thickness. The resilient disc-like member 12 includes a pair of radially opposed and substantially flat parallel side portions 14 and 16.

A first groove 18, having a first predetermined shape and a first predetermined depth, is formed in a first one 14 of such pair of radially opposed and substantially flat parallel side portions 14 and 16 of the resilient disc-like member 12. Such first groove 18 being disposed closely adjacent an outer edge 20 of the resilient disc-like member 12.

There is a second groove 22, having a second predetermined shape and a second predetermined depth, formed in a second one 16 of such pair of radially opposed and substantially flat parallel side portions 14 and 16 of the resilient disc-like member 12. This second groove 22 being substantially radially opposed to such first groove 18.

Preferably, the first predetermined shape of such first groove 18 will be substantially identical to the second predetermined shape of such second groove 22. Additionally, in this embodiment such first predetermined depth of the first groove 18 will be substantially identical to the second predetermined depth of such second groove 22.

The resilient disc-like member 12 has an aperture 24, having a second predetermined diameter, formed substantially through a center thereof.

In the presently preferred embodiment of the invention, such resilient disc-like member 12 is manufactured from a preselected rubber formulation. The particular rubber formulation selected will generally depend on the end application for such resilient type sealing member 10.

In the application of this improved resilient type sealing member 10 in a railway vehicle brake cylinder such first predetermined shape of such first groove 18 and the second predetermined shape of such second groove 22 will generally be V-shaped. Additionally, in this application, the first predetermined depth of such first groove 18 and the second predetermined depth of such second groove 22 are generally between about 0.495 and about 0.505 inch.

A width of such first groove 18 adjacent a surface of such first one 14 of the pair of radially opposed and substantially flat parallel side portions 14 and 16 of such resilient disc-like member 12 and a width of such second groove 22 adjacent a surface of the second one 16 of the pair of radially opposed and substantially flat parallel side portions 14 and 16 of the resilient disc-like member 12 will generally be between about 0.395 and about 0.405 inch.

In the improved resilient type sealing member 10, according to the presently preferred embodiment, such first predetermined diameter of the resilient disc-like member 12 is generally between about 2.75 and about 3.375 inches and the second predetermined diameter of such aperture 24 is generally between about 1.25 and about 1.438 inches. Further, in this embodiment, the predetermined thickness of such resilient disc-like member 12 is generally between about 1.25 and about 1.75 inches.

In the present invention, as can be seen from the above description, such resilient type sealing member 10 does not have a substantially uniform thickness since a portion of such disc-like member 12 has been removed to provide a groove 18 and 22, respectively, on each surface 14 and 16. The greater resiliency afforded by such grooves 18 and 22 permits such resilient sealing member 10 to bulge when the push rod member applies force, as in a braking position, with the virtual elimination of binding of the resilient sealing member 10 as had been found in prior art sealing members.

While a presently preferred and a number of alternative embodiments of the improved resilient type sealing member according to the present invention have been described in detail above, it should be understood that a number of other adaptations and modifications of such improved sealing member can be made by persons who are skilled in the sealing art without departing from either the spirit of the invention or the scope of the appended claims.

We claim:

1. An improved resilient type sealing member for use at least in a railway application which requires both sealing of an annular space located between an inner surface of a brake cylinder member and an adjacent outer surface of a piston member at least partially disposed for reciprocal movement within such brake cylinder member and for providing a required amount of support for such piston member during such reciprocal movement, said improved resilient type sealing member comprising:

(a) a generally uniformly round resilient disc-like member having each of a first predetermined diameter and a including a pair of radially opposed and substantially flat parallel side portions, said predetermined diameter being uniform along said predetermined thickness from a point closely adjacent a first side of said pair of radially opposed and substantially flat parallel side portions to a point closely adjacent a second side of said pair of radially opposed and substantially flat parallel side portions;

(b) a first groove, having a first predetermined shape and a first predetermined depth, formed in a first one of said pair of said radially opposed and substantially flat parallel side portions of said resilient disc-like member, said first groove being disposed closely adjacent an outer edge of said resilient disc-like member, said first groove beginning at said first one of said pair of substantially flat parallel side portions and extending inwardly therefrom toward a second one-of said pair of substantially flat parallel side portions;

(c) a second groove, having a second predetermined shape and a second predetermined depth, formed in said second one of said pair of said radially opposed and substantially flat parallel side portions of said resilient disc-like member, said second groove being disposed closely adjacent said outer edge of said resilient disc-like member, said second groove beginning at said second one of said pair of substantially flat parallel side portions and extending inwardly therefrom toward said first one of said pair of substantially flat parallel side portions, said second groove being substantially radially opposed to said first groove; and (d) a generally uniformly cylindrical aperture sealingly engageable with such adjacently disposed outer surface of such piston member, having a second predetermined diameter, formed substantially through a center of said resilient disc-like member.

2. An improved resilient type sealing member, according to claim 1, wherein said resilient disc-like member is manufactured from a preselected rubber formulation.

3. An improved resilient type sealing member, according to claim 1, wherein said first predetermined shape of said first groove is substantially identical to said second predetermined shape of said second groove.

4. An improved resilient type sealing member, according to claim 3, wherein said first predetermined depth of said first groove is substantially identical to said second predetermined depth of said second groove.

5. An improved resilient type sealing member, according to claim 4, wherein said first predetermined shape of said first groove and said second predetermined shape of said second groove are generally V-shaped.

6. An improved resilient type sealing member, according to claim 4, wherein said first predetermined depth of said first groove and said second predetermined depth of said second groove are generally between about 0.495 and about 0.505 inch.

7. An improved resilient type sealing member, according to claim 4, wherein a width of said first groove adjacent a surface of said first one of said pair of said radially opposed and substantially flat parallel side portions of said resilient disc-like member and a width of said second groove adjacent a surface of said second one of said pair of said radially opposed and substantially flat parallel side portions of said resilient disc-like member is generally between about 0.395 and about 0.405 inch.

8. An improved resilient type sealing member, according to claim 1, wherein said first predetermined diameter of said resilient disc-like member is generally between about 2.75 and about 3.375 inches.

9. An improved resilient type sealing member, according to claim 8, wherein said second predetermined diameter of said aperture is generally between about 1.25 and about 1.438 inches.

10. An improved resilient type sealing member, according to claim 9, wherein said predetermined thickness of said resilient disc-like member is generally between about 1.25 and about 1.75 inches.

11. In combination with a railway vehicle type brake cylinder, the improvement comprising an improved resilient type sealing member, said resilient type sealing member including:

(a) a generally uniformly round resilient disc-like member having each of a first predetermined diameter and a predetermined thickness, said resilient disc-like member including a pair of radially opposed and substantially flat parallel side portions, said predetermined diameter being uniform along said predetermined thickness from a point closely adjacent a first side of said pair of radially opposed and substantially flat parallel side portions to a point closely adjacent a second side of said pair of radially opposed and substantially flat parallel side portions;

(b) a first groove, having a first predetermined shape and a first predetermined depth, formed in a first one of said pair of said radially opposed and substantially flat parallel side portions of said resilient disc-like member, said first groove being disposed closely adjacent an outer edge of said resilient disc-like member, said first groove beginning at said first one of said pair of substantially flat parallel side portions and extending inwardly therefrom toward a second one of said pair of substantially flat parallel side portions;

(c) a second groove, having a second predetermined shape and a second predetermined depth, formed in said second one of said pair of said radially opposed and substantially flat parallel side portions of said resilient disc-like member, said second groove being disposed closely adjacent said outer edge of said resilient disc-like member, said second groove beginning at said second one of said pair of substantially flat parallel side portions and extending inwardly therefrom toward said first one of said pair of substantially flat parallel side portions, said second groove being substantially radially opposed to said first groove; and (d) a generally uniformly cylindrical aperture sealingly engageable with a push rod of such railway vehicle type brake cylinder along an outer surface of such push rod adjacently disposed with said sealing member, having a second predetermined diameter, formed substantially through a center of said resilient disc-like member.

12. An improved resilient type sealing member for a railway vehicle type brake cylinder, according to claim 11, wherein said resilient disc-like member is manufactured from a preselected rubber formulation.

13. An improved resilient type sealing member for a railway vehicle type brake cylinder, according to claim 11, wherein said first predetermined shape of said first groove is substantially identical to said second predetermined shape of said second groove.

14. An improved resilient type sealing member for a railway vehicle type brake cylinder, according to claim 13, wherein said first predetermined depth of said first groove is substantially identical to said second predetermined depth of said second groove.

15. An improved resilient type sealing member for a railway vehicle type brake cylinder, according to claim 14, wherein said first predetermined shape of said first groove and said second predetermined shape of said second groove are generally V-shaped.

16. An improved resilient type sealing member for a railway vehicle type brake cylinder, according to claim 14, wherein said first predetermined depth of said first groove and said second predetermined depth of said second groove are generally between about 0.495 and about 0.505 inch.

17. An improved resilient type sealing member for a railway vehicle type brake cylinder, according to claim 14, wherein a width of said first groove adjacent a surface of said first one of said pair of said radially opposed and substantially flat parallel side portions of said resilient disc-like member and a width of said second groove adjacent a surface of said second one of said pair of said radially opposed and substantially flat parallel side portions of said resilient disc-like member is generally between about 0.395 and about 0.405 inch.

18. An improved resilient type sealing member for a railway vehicle type brake cylinder, according to claim 11, wherein said first predetermined diameter of said resilient disc-like member is generally between about 2.75 and about 3.375 inches.

19. An improved resilient type sealing member for a railway vehicle type brake cylinder, according to claim 18, wherein said second predetermined diameter of said aperture is generally between about 1.25 and about 1.438 inches.

20. An improved resilient type sealing member for a railway vehicle type brake cylinder, according to claim 19, wherein said predetermined thickness of said resilient disc-like member is generally between about 1.25 and about 1.75 inches.

* * * * *